Patented June 19, 1934

1,963,339

UNITED STATES PATENT OFFICE 1,963,339

AIR VULCANIZABLE RUBBER COMPOUND AND METHOD OF MANUFACTURE

Percy N. Sylvester, South Weymouth, Mass., assignor, by mesne assignments, to Colvulc Rubber Company, a corporation of Massachusetts No Drawing. Application August 5, 1930, Serial No. 473,262. Renewed November 15, 1933

4 Claims. (Cl. 106—23)

The present invention relates to a vulcanizable rubber compound and its process of manufacture.

The object of the invention is to provide a rubber compound having at least sufficient plasticity to permit of its manipulation, and which, on exposure to the air, will bond firmly to old rubber surfaces or to irregular metal surfaces in the manner of the usual vulcanizable compositions.

Such a compound has particular application for the repair or replacement of rubber coverings such as conveyor belts, conveyor chutes and metallic receptacles of all kinds which must be protected against corrosion. The compound, upon curing by exposure to the air, is free from the permanently tacky and sticky characteristics of a rubber cement, and is ideally suited for protective coatings. It does not have the springy or more highly resilient qualities of certain rubber products vulcanized under heat and pressure in the usual fashion, and is not intended nor adapted for use in products where these characteristics are essential.

In the production of my new compound I am enabled to effectively use a large percentage of scrap rubber, providing such scrap is reasonably free or has had removed therefrom fabric which may have been previously mixed therewith. The scrap rubber is reduced to a relatively fine powder by grinding on an emery wheel or through any equivalent means. The reduction of the scrap rubber to a powdered form rather than its employment in larger particles is essential to the desired physical characteristics of the finished products. Having thus reduced the scrap rubber to a powdered form, I prepare a rubber cement in the proportions of one pound of pale crepe to one gallon of benzol or any equivalent solvent. To this cement may be added smaller amounts of carbon black for coloring purposes, and any suitable accelerator active at low temperatures such as zimate or captex composed essentially of mercaptobenzothiazole in the approximate proportion of one part of accelerator to one hundred parts of cement. To this cement is then added a rubber latex suspension having a concentration of 33⅓% in the proportion of five parts of latex suspension to each one hundred parts of cement, and the whole thoroughly mixed in any desired manner to produce a suspension. The resulting cement with the latex suspension added may be combined with the ground scrap filler by mixing equal quantities by volume of ground rubber and liquid cement.

This method produces a plastic rubber paste which permanently maintains its plastic condition if kept in a container from which air is excluded. If it is desired to increase the liquidity of the compound, a larger proportion of latex cement may be added, for example, in the proportion by volume of sixty parts of latex cement to forty parts of ground rubber. If, on the other hand, it is desired to produce a stiffer compound, a larger percentage of ground rubber may be employed, perhaps up to a proportion of 60% of ground rubber to 40% of latex cement. In specific instances I have found it feasible to stiffen the compound by the addition of quantities of certain inert filling ingredients.

This compound may be successfully employed for repair purposes as, for example, the patching of rubber conveyor belts. In the patching of rubber surfaces in this manner it may be worked into the worn portion of the surface, and after exposure to air for a period of hours it will become thoroughly and effectively bonded by vulcanization to the old rubber surface. The compound may also be effectively employed for the production of protective coatings as chute linings, tank and metal receptacle linings, protective coatings where the rubber compound is applied to a supporting metal sheet perforated or foraminous to permit penetration and bonding of the protective rubber coating. The present compound is ideally suited for all of these purposes, and provides an eminently satisfactory covering of the type desired in articles of this character.

The important aspect of the present compound and its method of production is the combining of an oil solution of rubber, commonly called rubber cement, with an aqueous suspension of latex. When such a product has combined therewith an accelerator adapted to function at atmospheric temperatures, a product having many desirable characteristics is produced, and moreover, a product which may be more effectively bonded to metal and similar surfaces than is possible with the usual compounds requiring high temperatures and pressures for vulcanization. This may be in part due to the fact that the cure of the compound at atmospheric temperatures avoids the formation of steam and high temperature vapors which interfere with the bonding of the rubber to the metal surfaces.

I claim:—

1. An air vulcanizable rubber compound comprising a filler as ground scrap, a solution of rubber, a latex suspension and an accelerator designed to function at room temperatures.

2. An air vulcanizable rubber compound comprising rubber cement and a latex suspension thoroughly mixed, to which an accelerator designed to function at room temperature has been added, and a substantial volume of ground scrap rubber.

3. The method of preparing an air vulcanizable rubber compound which comprises the preparation of a mixture of a latex suspension and rubber cement which includes dissolving uncured rubber in a solvent, adding and thoroughly mixing an aqueous suspension of rubber latex, adding a small quantity of an accelerator designed to function at room temperature, and mixing the liquid latex cement with ground scrap rubber.

4. The method of preparing a vulcanizable rubber compound which consists in combining and thoroughly mixing rubber cement and a latex suspension, subsequently combining the resulting liquid with a filler such as ground scrap rubber to produce a plastic compound and adding an accelerator designed to function at room temperature.

PERCY N. SYLVESTER.